United States Patent
Miyahara

(10) Patent No.: US 6,315,229 B1
(45) Date of Patent: Nov. 13, 2001

(54) TAPE TRANSPORT DEVICE

(75) Inventor: Kazuhiro Miyahara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/537,528

(22) Filed: Mar. 29, 2000

(30) Foreign Application Priority Data

Mar. 30, 1999 (JP) .................................................. 11-088742

(51) Int. Cl.⁷ .................................................. B65H 59/38
(52) U.S. Cl. .................................................. 242/334.1
(58) Field of Search .................. 242/334.1, 334.2, 242/334.3, 334.4; 360/73.01, 73.05, 73.06, 73.07, 73.08, 73.13

(56) References Cited

U.S. PATENT DOCUMENTS

| | | |
|---|---|---|
| 4,394,994 * | 7/1983 | Oono . |
| 4,478,376 * | 10/1984 | Sakaguchi et al. . |
| 4,496,117 * | 1/1985 | Kashiwagi et al. . |
| 4,516,740 * | 5/1985 | Yoshino et al. . |
| 4,663,573 * | 5/1987 | Maetani et al. . |
| 4,977,466 * | 12/1990 | Nakata . |
| 4,993,660 * | 2/1991 | Harigaya et al. . |
| 5,138,504 * | 8/1992 | Nishijima et al. . |
| 5,662,287 * | 9/1997 | Kim . |
| 5,803,387 * | 9/1998 | Mace . |
| 5,839,683 * | 11/1998 | Kijima et al. . |
| 6,089,485 * | 7/2000 | Kijima et al. . |
| 6,158,682 * | 12/2000 | Kijima et al. . |

* cited by examiner

*Primary Examiner*—William A. Rivera
(74) *Attorney, Agent, or Firm*—Ratner & Prestia

(57) ABSTRACT

A tape transfer device in which the running velocity of a tape is reduced with a plurality of steps before the end of the tape in the occasion of the fast forward or backward winding of the tape, whereby the time required for the fast forward or backward winding of the tape is decreased in such a manner that the time required for winding up the tape from the first deceleration beginning position of the tape to the end of the tape is decreased in the case that the thickness of the tape is decreased from ordinary one (d) to thinner one ($d_1$).

2 Claims, 5 Drawing Sheets

TAPE TRANSPORT DEVICE

FIELD OF THE INVENTION

The present invention relates to a tape transport device installed in a magnetic recording and reproducing apparatus such as a video tape recorder or the like which uses a tape-shaped-media (hereinafter abbreviated as "tape")

BACKGROUND OF THE INVENTION

In recent years, under the circumstance that a random-accessible disk-shaped-media or the like has become popular, the decrease of the time required for the fast forward or backward winding of a tape is also required. The probable solution for decreasing the time required for the fast forward or backward winding of the tape is to increase the running velocity of the tape (hereinafter abbreviated as "tape velocity" in some cases).

However, when the tape come to the end thereof running at a high velocity, the tape or the tape transport of an apparatus is damaged. Therefore, the tape velocity has to be reduced to a safe velocity before the end of the tape (hereinafter abbreviated as "tape end" in some cases) so that the tape or the tape transport is not damaged at the tape end. In this case, for obtaining good effect in decreasing the time for the fast forward or backward winding of the tape, high tape velocity has to be kept up to around the end of the tape, and, the tape velocity has to be reduced as quickly as possible to the safe velocity which does not damage the tape or the tape transport at the tape end after a decelerating measure is taken on the tape.

Hereinafter a conventional tape transport device is described on reference to FIG. 5 which shows structure for performing the fast forward or backward winding of a tape in the conventional tape transport device.

In FIG. 5, a first reel 52, on which a tape is wound from one end thereof, is rotated by a motor 51 in such a manner as to rotate at the rotational velocity which is proportional to the rotational velocity of the motor 51. On a second reel 53, the tape is wound from the other end thereof. A present-position-detecting-unit 54 detects the present position of the tape based on a first and a second rotation detecting signals respectively generated by the first reel 52 and the second reel 53 in such a manner as to have respective frequencies which are proportional to the respective rotational velocities of the first reel 52 and the second reel 53. A velocity detecting unit 55 detects the running velocity of the tape based on the rotation detecting signals generated by the first reel 52 and the second reel 53, and a motor-rotation-detecting-signal generated by the motor 51. A decelerating-position-storing-unit 56 stores the deceleration beginning position of the tape, which is used in the occasion of the fast forward or backward winding of the tape. A comparing unit 57 compares the present position with the deceleration beginning position of the tape. A motor control unit 58 instructs the motor 51 to reduce the rotational velocity of the motor 51 when the comparing unit 57 judges that the present position is located at the deceleration beginning position or behind the deceleration beginning position in the running direction of the tape.

The operation of the conventional tape transport having the above structure is described hereinafter. To begin with, the first reel 52, on which a tape is wound from one end thereof, is rotated by the motor 51 in such a manner as to rotate at the rotational velocity which is proportional to the rotational velocity of the motor 51, whereby the second reel 53, on which the tape is wound from the other end thereof, rotates in such a manner that the tape wound on the second reel 53 is wound up by the first reel 52. The present-position-detecting-unit 54 detects the present position of the tape based on the rotation detecting signals generated by the first reel 52 and the second reel 53. The comparing unit 57 compares the present position detected by the present-position-detecting-unit 54 with the deceleration beginning position stored in the decelerating-position-storing-unit 56. When the comparing unit 57 judges that the present position is located at the deceleration beginning position or behind the deceleration beginning position in the running direction of the tape, the motor control unit 58 instructs the motor 51 to reduce the rotational velocity of the motor 51, whereby the rotational velocity of the motor 51 (i.e., the tape velocity) is reduced.

After that, when the velocity detecting unit 55 detects that the tape velocity is reduced to a predetermined safe velocity which does not damage the tape or the tape transport at the tape end, the motor control unit 58 stops the decelerating instruction to the motor 51, whereby the tape comes to the end thereof running at the safe velocity.

The deceleration beginning position stored in the decelerating-position-storing-unit 56 is set at a position computed in such a manner that the tape velocity can be reduced to the safe velocity which does not damage the tape and the tape transport just before the tape end by reducing the tape velocity with a predetermined uniform deceleration.

FIG. 6 shows an ideal relation between the running velocity of a tape and the time required for reducing the tape velocity from v to v' in the conventional tape transport device. That is, FIG. 6 shows that a tape running at a velocity v is uniformly reduced to a velocity v', which is a maximum tape velocity for avoiding damage on the tape or the tape transport at the tape end, with a predetermined uniform deceleration (i.e., uniform negative acceleration) a by beginning the deceleration of the tape from a deceleration beginning position S (S denotes also the remaining area of the tape at the deceleration beginning position).

In this case, the running dimension L of the tape in the duration of reducing the tape velocity from v (i.e., tape velocity at the deceleration beginning position) to v' (i.e., maximum tape velocity for avoiding damage on the tape or the tape transport at the tape end) is expressed by $$L=(v-v')^2/2a.$$

Also, when the thickness of the tape is denoted by d, the deceleration beginning position (i.e. the remaining area of the tape at the deceleration beginning position) S for minimizing the time required for reducing the tape velocity from v to v' is expressed by $$S=L\times d$$

Therefore, by storing the deceleration beginning position S, which is expressed by the above relation, in the decelerating-position-storing-unit 56, the time required for winding up the tape from the deceleration beginning position to the end of the tape is minimized.

The comparing unit 57 compares the present position detected by the present-position-detecting-unit 54 with the deceleration beginning position S stored in the decelerating-position-storing-unit 56. When the comparing unit 57 judges that the present position is located at the deceleration beginning position S or behind the deceleration beginning position S in the running direction of the tape, the motor control unit 58 instructs the motor 51 to reduce the rotational velocity of the motor 51.

The following is a description on the case that the thickness of the tape is reduced to $d_1$ ($d_1<d$) for increasing the recording time or decreasing the cost of the tape. FIG. 7 shows the relation between the running velocity of a tape and the time required for reducing the tape velocity from v to v' in the case that the thickness of the tape is decreased from d to $d_1$. In FIG. 7, v, v', a, L and S denote the same as in FIG. 6, and, $L_1$ denotes remaining tape length at the position where the tape velocity is reduced to v'. In this case, the deceleration beginning position S is expressed by $$S = L \times d = (L + L_1) \times d_1.$$

Therefore, $$L_1 = L \times (d - d_1)/d_1 \qquad (20).$$

As a result, the time required for winding up the tape from the deceleration beginning position to the end of the tape on the tape having the thickness of $d_1$ is longer by t which is expressed by $$t = L_1/v' = \{(d - d_1)/d_1\} \times L/v'.$$

As described in the above, in the conventional tape transport device, when the thickness of the tape is decreased, the time required for winding up the tape from the deceleration beginning position to the end of the tape considerably increases (i.e., the time required for the fast forward or backward winding of the tape considerably increases when the thickness of the tape is decreased).

SUMMARY OF THE INVENTION

The object of the present invention is to address the conventional problem and to provide a tape transport device in which the time required for the fast forward or backward winding of a tape is decreased even when the thickness of the tape is decreased, in such a manner that the time required for winding up the tape from the deceleration beginning position of the tape to the end of the tape is decreased. For realizing the above object, in the tape transport device of the present invention, a plurality of decelerating positions are provided and the tape velocity is reduced with a plurality of steps in such a manner that the tape velocity is reduced to a first velocity in a first step, and further to a second velocity in a second step, and so on.

For realizing the above object, a first tape transport device of the present invention comprises, (a) a motor (b) a first reel on which a tape is wound from one end thereof and rotates at the rotational velocity which is proportional to the rotational velocity of the motor, (c) a second reel on which the tape is wound from the other end thereof, (d) a present-position-detecting-unit for detecting the present position of the tape based on a first and a second rotation detecting signals respectively generated by the first and the second reels in such a manner as to have respective frequencies which are proportional to the respective rotational velocities of the first and the second reels, (e) a velocity detecting unit for detecting the running velocity of the tape based on the first and the second rotation detecting signals, and a motor-rotation-detecting-signal generated by the motor in such a manner as to have frequency which is proportional to the rotational velocity of the motor, (f) a plurality of decelerating-position-storing-units for respectively storing deceleration beginning positions used in the occasion of the fast forward or backward winding of the tape, (g) a comparing unit for comparing the present position with either of the deceleration beginning positions of the tape, (h) a motor control unit for controlling the rotational velocity of the motor based on the running velocity of the tape, which is detected by the velocity detecting unit, and for instructing the motor to reduce the rotational velocity of the motor when the comparing unit judges that the present position is located at either of the deceleration beginning positions or behind either of the deceleration beginning positions in the running direction of the tape.

In the first tape transport device of the present invention having the above structure, the deceleration of the tape is performed in such a manner as to reduce the tape velocity to a first velocity in a first step, and further to a second velocity in a second step, and so on, whereby the time required for winding up the tape from the first deceleration beginning position to the end of the tape is decreased comparing with the conventional tape transport device, in the case that the thickness of the tape is decreased.

Also, for realizing the above object, a second tape transport device of the present invention comprises, (a) a motor, (b) a first reel on which a tape is wound from one end thereof and rotates at the rotational velocity which is proportional to the rotational velocity of the motor, (c) a second reel on which the tape is wound from the other end thereof, (d) a present-position-detecting-unit for detecting the present position of the tape based on a first and a second rotation detecting signals respectively generated by the first and the second reels in such a manner as to have respective frequencies which are proportional to the respective rotational velocities of the first and the second reels, (e) a tape-area-detecting-unit for detecting the respective areas of the tape wound on the first and the second reels based on the first and the second rotation detecting signals, (f) a velocity detecting unit for detecting the running velocity of the tape based on the fast and the second rotation detecting signals, and a motor-rotation-detecting-signal generated by the motor in such a manner as to have frequency which is proportional to the rotational velocity of the motor, (g) a plurality of decelerating-position-storing-units for respectively storing deceleration beginning positions used in the occasion of the fast forward or backward winding of the tape, (h) a decelerating-position-selecting-unit for selecting proper deceleration beginning positions from the deceleration beginning positions stored in the plurality of decelerating-position-storing-units based on the tape areas detected by the tape-area-detecting-unit, (i) a comparing unit for comparing the present position with either of the selected deceleration beginning positions of the tape, (j) a motor control unit for controlling the rotational velocity of the motor based on the running velocity of the tape, which is detected by the velocity detecting unit, and for instructing the motor to reduce the rotational velocity of the motor when the comparing unit judges that the present position is located at either of the selected deceleration beginning positions or behind either of the selected deceleration beginning positions in the running direction of the tape.

In the second tape transport device of the present invention having the above structure, in addition to the operation in the first tape transport device of the present invention, the respective areas of the tape wound on the first and the second reels are detected, and, proper deceleration beginning positions are selected from deceleration beginning positions respectively stored in the plurality of decelerating-position-storing-units for respective tapes having different diameters of the windings of the respective tapes (i.e., different diameter hubs formed with the windings of the respective tapes, each of which is wound on a first reel and a second reel) based on the detected tape areas, whereby the time required for winding up the tape from the first deceleration beginning position of the tape to the end of the tape is decreased in such a manner that the deceleration of the tape is properly performed according to the diameters of the hubs of each of the tapes.

DETAILED DESCRIPTION OF THE INVENTION

Hereinafter exemplary embodiments in the present invention are described on reference to illustrations.

FIRST EXEMPLARY EMBODIMENT

Figure 1:
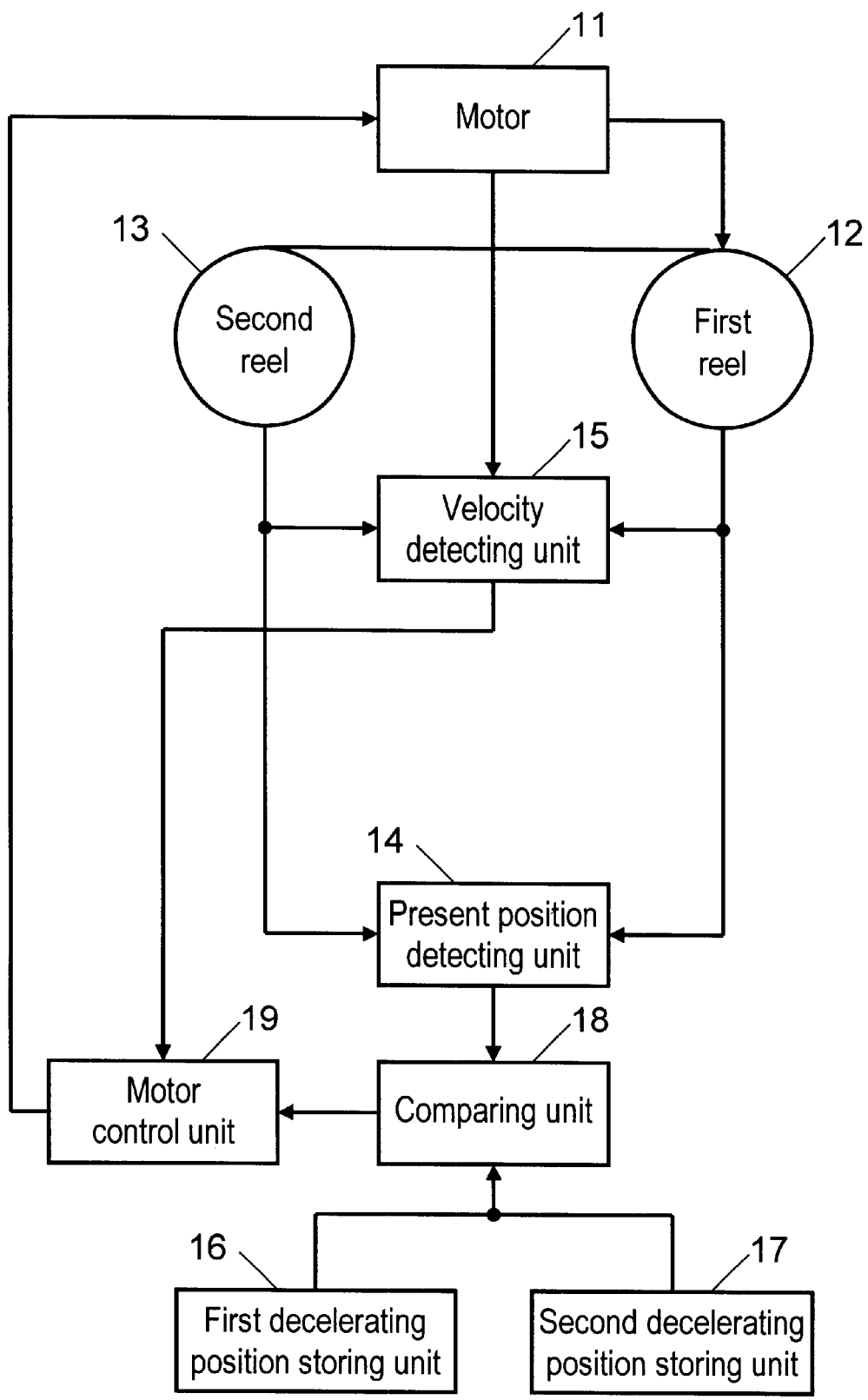
FIG. 1 is a block diagram showing the structure of a tape transport device in a first exemplary embodiment in the present invention.

FIG. 1 is a block diagram showing the structure of a tape transport device in a first exemplary embodiment in the present invention. In FIG. 1, a first reel 12 is rotated by a motor 11 in such a manner as to rotate at the rotational velocity which is proportional to the rotational velocity of the motor 11. On the first reel 12, a tape is wound from one end thereof. On a second reel 13, the tape is wound from the other end thereof A present-position-detecting-unit 14 detects the present position of the tape based on a first and a second rotation detecting signals respectively generated by the first reel 12 and the second reel 13. A velocity detecting unit 15 detects the running velocity of the tape based on the rotation detecting signals generated by the first reel 12 and the second reel 13, and a motor-rotation-detecting-signal generated by the motor 11. A first decelerating-position-storing-unit 16 stores a first deceleration beginning position of the tape, which is used in the occasion of the fast forward or backward winding of the tape. A second decelerating-position-storing-unit 17 stores a second deceleration beginning position of the tape, which is used in the occasion of the fast forward or backward winding of the tape. A comparing unit 18 compares the present position with the first or the second deceleration beginning position of the tape. A motor control unit 19 instructs the motor 11 to reduce the rotational velocity of the motor 11 when the comparing unit 18 judges that the present position is located at the first or the second deceleration beginning position, or, behind the first or the second deceleration beginning position in the running direction of the tape.

Figure 2:
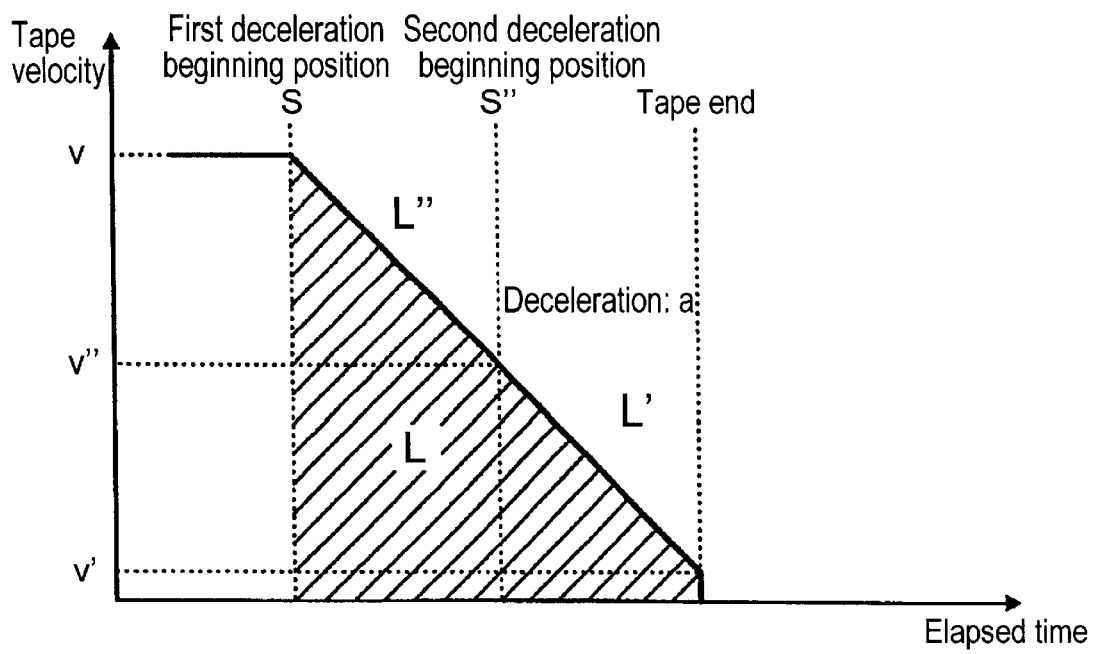
FIG. 2 shows the relation between the running velocity of a tape and the time required for reducing the running velocity of the tape in the case that the thickness of the tape is d in the tape transport devices in the first and a second exemplary embodiments in the present invention.
Figure 3:
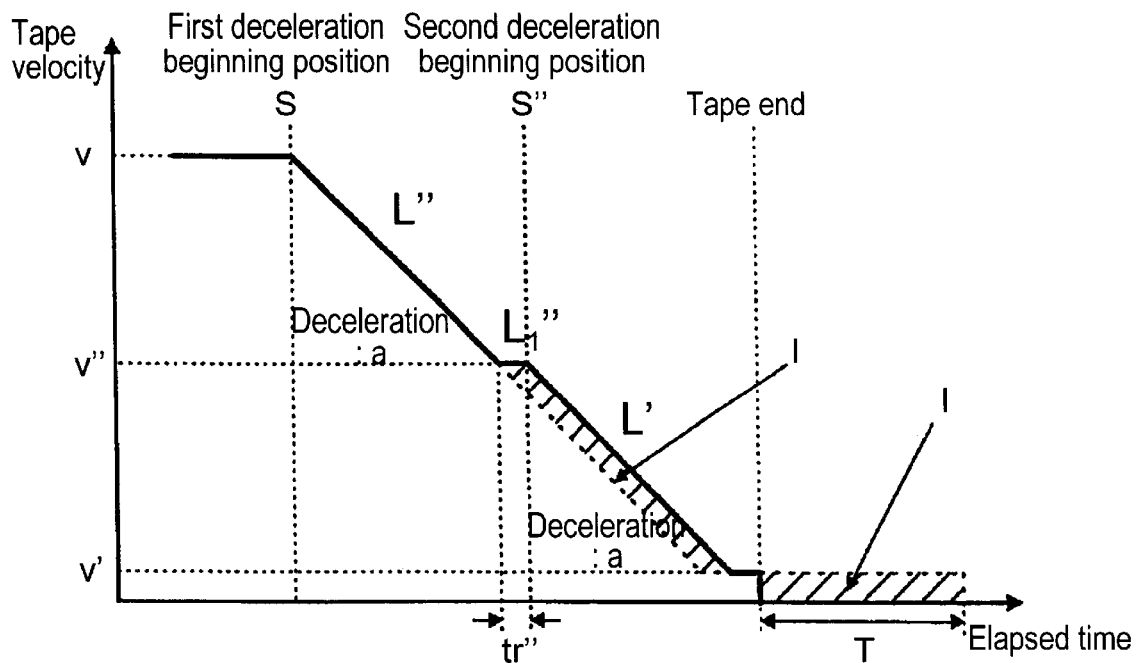
FIG. 3 shows the relation between the running velocity of a tape and the time required for reducing the running velocity of the tape in the case that the thickness of the tape is deceased to $d_1$ in the tape transport devices in the first and the second exemplary embodiments in the present invention.

The operation of the tape transport device in this exemplary embodiment having the above structure is described hereinafter on reference to FIG. 1 through FIG. 3. FIG. 2 shows the relation between the running velocity of a tape and the time required for reducing the tape velocity in the case that the thickness of the tape is d in the tape transport devices in the first and a second exemplary embodiments in the present invention, and, FIG. 3 shows the relation between the running velocity of a tape and the time required for reducing the tape velocity in the case that the thickness of the tape is reduced to $d_1$ in the tape transport devices in the first and the second exemplary embodiments in the present invention.

To begin with, the first reel 12 is rotated by the motor 11 in such a manner as to rotate at the rotational velocity which is proportional to the rotational velocity of the motor 11, whereby the second reel 13 rotates in such a manner that the tape wound on the second reel 13 is wound up by the first reel 12. The present-position-detecting-unit 14 detects the present position of the tape based on the first and the second rotation detecting signals respectively generated by the first reel 12 and the second reel 13. The comparing unit 18 compares the present position detected by the present-position-detecting-unit 14 with the first deceleration beginning position stored in the first decelerating-position-storing-unit 16, or with the second deceleration beginning position stored in the second decelerating-position-storing-unit 17.

When the comparing unit 18 judges that the present position of the tape is located at the first deceleration beginning position or behind the first deceleration beginning position in the running direction of the tape, the motor control unit 19 instructs the motor 11 to reduce the rotational velocity of the motor 11, whereby the rotational velocity of the motor 11 (i.e., the tape velocity) is reduced. After that, when the velocity detecting unit 15 detects that the tape velocity is reduced to a predetermined reduced velocity, the motor control unit 19 suspends the decelerating instruction to the motor 11, whereby the tape velocity is kept at the predetermined reduced velocity.

After that, when the comparing unit 18 judges that the present position detected by the present-position-detecting-unit 14 is located at the second deceleration beginning position or behind the second deceleration beginning position in the running direction of the tape, the motor control unit 19 instructs the motor 11 to reduce the rotational velocity of the motor 11, whereby the rotational velocity of the motor 11 (i.e., the tape velocity) is reduced. After that, when the velocity detecting unit 15 detects that the tape velocity is reduced to a predetermined safe velocity which does not damage the tape or the tape transport of an apparatus at the tape end, the motor control unit 19 stops the decelerating instruction to the motor 11, whereby the tape velocity is kept at the predetermined safe velocity up to the end of the tape.

The first deceleration beginning position stored in the first decelerating-position-storing-unit 16 is set at a position computed in such a manner that the tape velocity can be reduced to a predetermined velocity when the tape velocity is reduced with a predetermined uniform deceleration (i.e., uniform negative acceleration) from the first deceleration beginning position to the second deceleration beginning position, and, the second deceleration beginning position stored in the second decelerating-position-storing-unit 17 is set at a position computed in such a manner that tape velocity can be reduced to a predetermined safe velocity which does not damage the tape or the tape transport at the tape end when the tape velocity is reduced with the predetermined uniform deceleration (i.e. uniform negative acceleration) from the second deceleration beginning position to the tape end.

Hereinafter the further details of the operation of the tape transport device in this exemplary embodiment is described on reference to FIG. 2 and FIG. 3.

First, the case that the tape has the thickness of d is described on reference to FIG. 2. In FIG. 2, v denotes a tape velocity at the first deceleration beginning position S (S denotes also the remaining area of the tape at the first deceleration beginning position), v' denotes a maximum tape velocity which does not damage the tape or the tape transport at the tape end, a denotes a deceleration (i.e., negative acceleration) in reducing the tape velocity from v to v', L denotes the running dimension of the tape in the duration of reducing the tape velocity from v to v', L" denotes the running dimension of the tape in the duration of reducing the tape velocity from v to v", L' denotes the running dimension of the tape in the duration of reducing the tape velocity from v" to v' and v" denotes a tape velocity at the second deceleration beginning position S". In this case, the relations of v, v' a, L, L' and L" are expressed by $$L=(v-v')^2/2a$$

$$L=L''+L'$$

Also, the first deceleration beginning position S, which is a position for minimizing the time required for reducing the tape velocity by the end of the tape from v to v' for avoiding damage on the tape or the tape transport at the tape end, is expressed by $$S=L \times d$$

The first deceleration beginning position S expressed by the above relation is stored in the first decelerating-position-storing-unit 16, and, the comparing unit 18 compares the present position detected by the present-position-detecting-unit 14 with the deceleration beginning position S stored in the first decelerating-position-storing-unit 16. When the comparing unit 18 judges that the present position is located at the first deceleration beginning position S or behind the first deceleration beginning position S in the running direction of the tape, the motor control unit 19 instructs the motor 11 to reduce the rotational velocity of the motor 11.

Next, the case, in which the thickness of the tape is decreased to $d_1$ ($d_1 < d$) for increasing the recording time or decreasing the cost, is described hereinafter.

The thick continuous line of FIG. 3 shows the relation between the running velocity of a tape and the time required for reducing the tape velocity in two steps in the case that the thickness of the tape is decreased to $d_1$. The thick dashed line of FIG. 3 shows the relation between the running velocity of the tape having the decreased thickness $d_1$ and the time required for reducing the tape velocity in one step (i.e., as in conventional tape transport device).

In the two-step deceleration of FIG. 3, the tape velocity is reduced from v to v" with a uniform deceleration (i.e., uniform negative acceleration) a from the first deceleration beginning position S (i.e., the position at which the remaining tape area is S), and, after the tape velocity is reduced to v", the tape velocity is kept at the velocity v" up to the second deceleration beginning position S" (i.e., the position at which the remaining tape area is S). Then from the second deceleration beginning position S" the tape velocity is reduced with the uniform deceleration (i.e., uniform negative acceleration) a up to the position where the tape velocity is reduced to v' which does not damage the tape or the tape transport at the tape end, and the tape velocity is kept at the velocity v' up to the end of the tape. $L_1$" denotes the running dimension of the tape in the duration of the tape velocity v" (i.e., in the duration from the moment when the tape velocity is reduced to v" up to the moment when the tape position comes to the second deceleration beginning position S"). In this case, the relation of S, S", L", $L_1$", d and $d_1$ is expressed by $$S-S''=L'' \times d=(L''+L_1'') \times d_1.$$

Therefore, $$L_1''=\{(d-d_1)/d_1\} \times L''.$$

The time $t_1$" of FIG. 3, which denotes the time required for the tape to run from the position where the tape velocity is reduced to v" up to the second deceleration beginning position S" is expressed by $$t_1''=L_1''/v''=\{(d-d_1)/d_1\} \times L''/v''$$

Also, in FIG. 3, a first shadowed area 1 surrounded by the thick continuous line and the thick dashed line, and, a second shadowed area 1 under the thick dashed line (i.e., the area shown on T in FIG. 3) is equal. The second shadowed area 1 denotes the time additionally required in the one-step deceleration comparing with the two-step deceleration in reducing the tape velocity from v to v'. The first shadowed area 1, which is equivalent with the second shadowed area 1, is expressed by $$l=t_1'' \times (v''-v')=\{(d-d_1)/d_1\} \times \{(v''-v')/v''\} \times L''.$$

Therefore, in the one-step deceleration, the time required for winding up the tape from the first deceleration beginning position to the end of the tape is longer by T which is expressed by $$T=l/v''=\{(d-d_1)/d_1\} \times \{(v''-v')/v''\} \times L''/v''$$

comparing with the case of the two-step deceleration in the occasion of the fast forward or backward winding of the tape.

In the above description, the two decelerating-position-storing-units 16 and 17 are disposed. However, by disposing more decelerating-position-storing-units for storing respective deceleration beginning positions, the similar effect can be obtained.

As described in the above, the time required for the fast forward or backward winding of the tape can be decreased in such a manner that the tape velocity is reduced to the safe velocity just before the end of the tape by reducing the tape velocity with a plurality of steps by disposing a plurality of decelerating-position-storing-units for respectively storing deceleration beginning positions which are used in the occasion of the fast forward or backward winding of the tape.

SECOND EXEMPLARY EMBODIMENT

Figure 4:
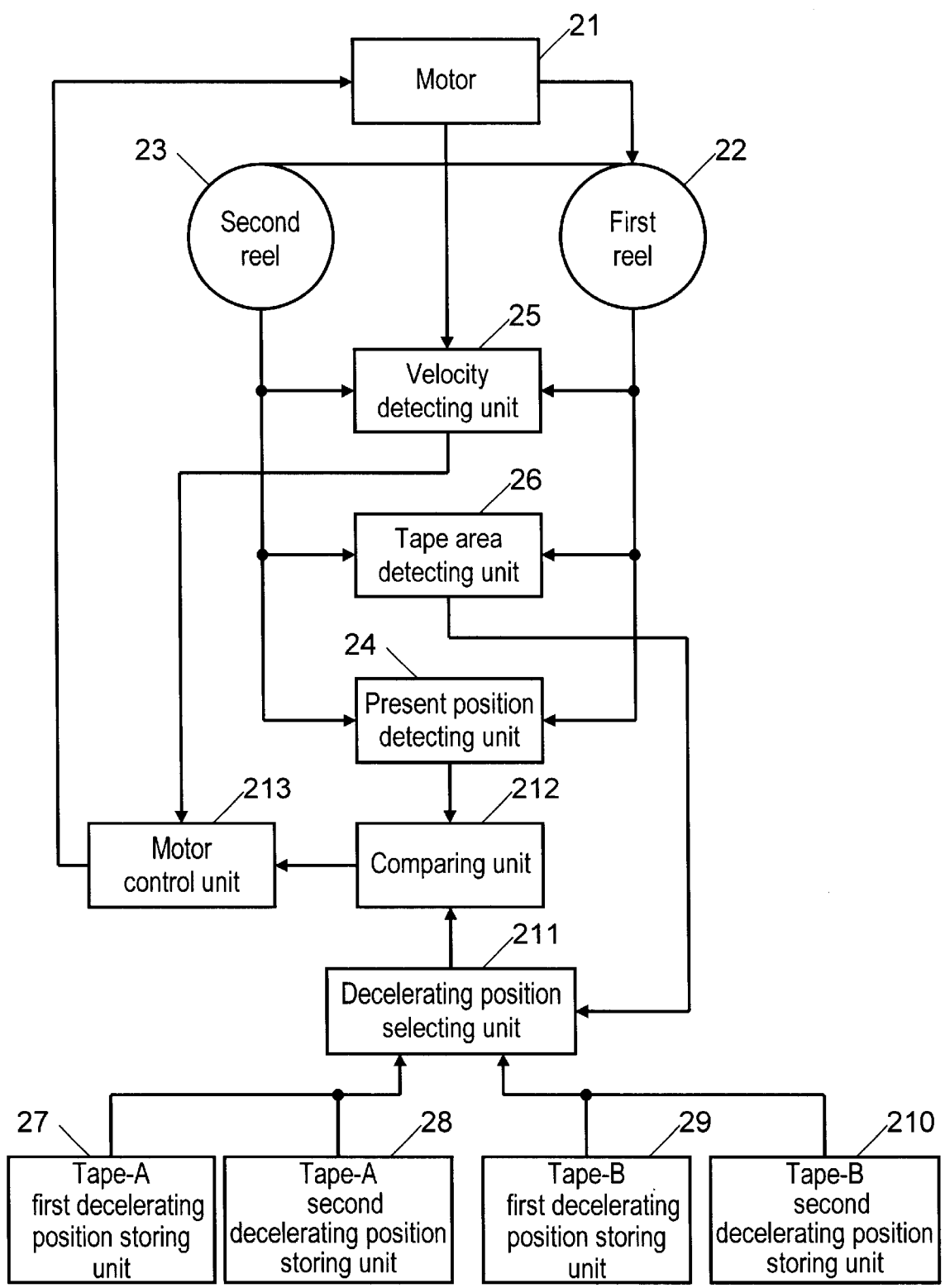
FIG. 4 is a block diagram showing the structure of the tape transport device in the second exemplary embodiment in the present invention.
Figure 5:
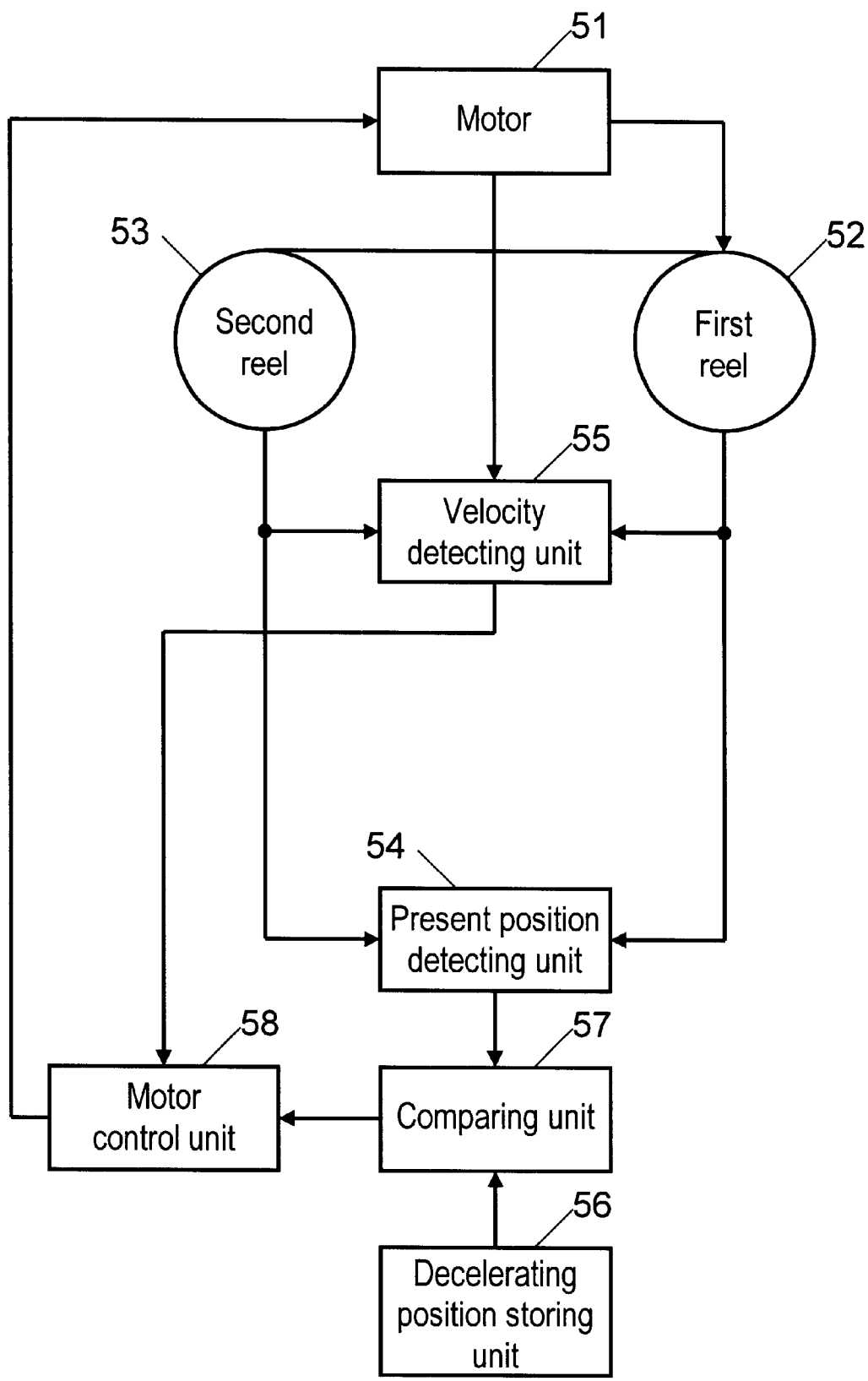
FIG. 5 is a block diagram showing the structure of a conventional tape transport device.
Figure 6:
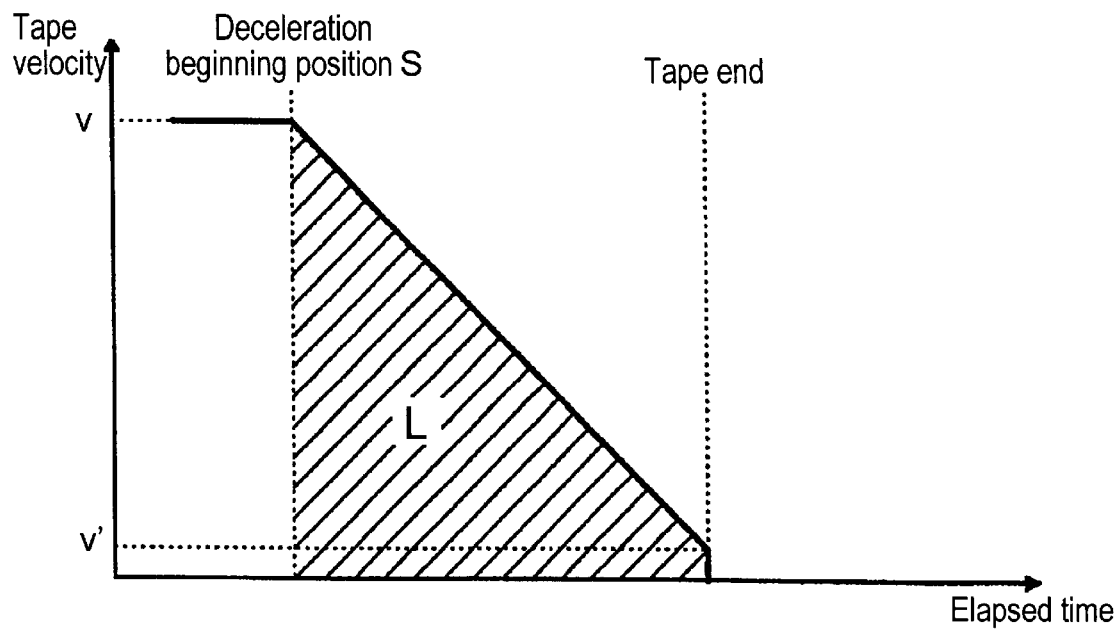
FIG. 6 shows the relation between the running velocity of a tape and the time required for reducing the running velocity of the tape in the case that the thickness of the tape is d in the conventional tape transport device.
Figure 7:
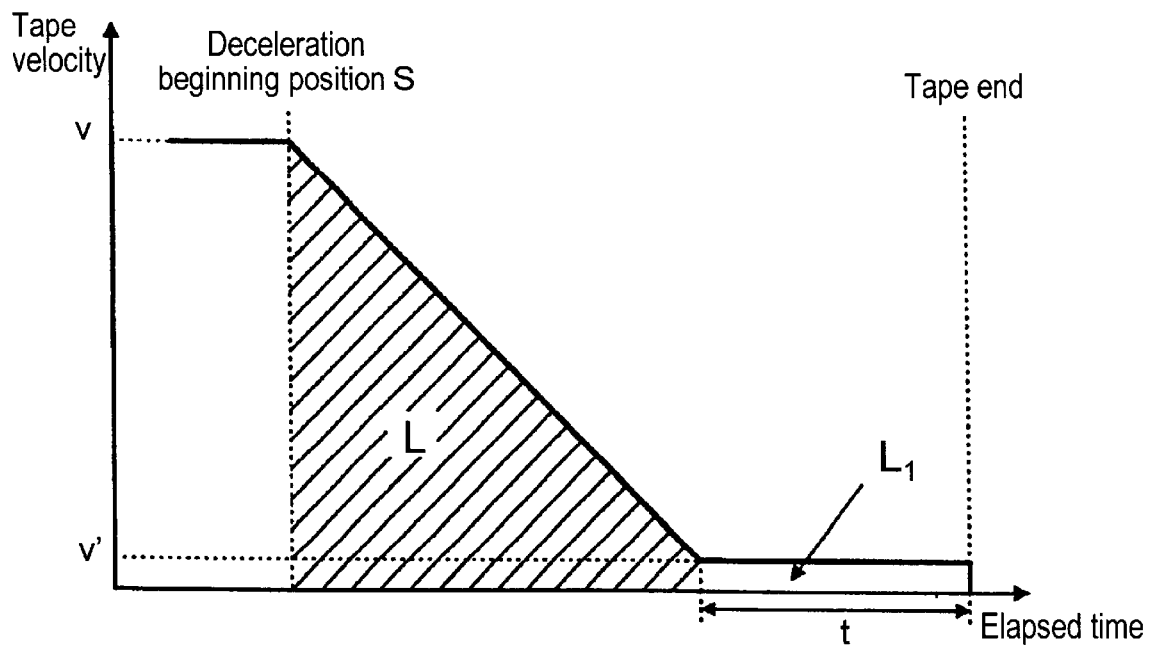
FIG. 7 shows the relation between the running velocity of a tape and the time required for reducing the running velocity of the tape in the case that the thickness of the tape is decreased to $d_1$ in the conventional tape transport device.

FIG. 4 is a block diagram showing the structure of a tape transport device in a second exemplary embodiment in the present invention.

In FIG. 4, a first reel 22 is rotated by a motor 21 in such a manner as to rotate at the rotational velocity which is proportional to the rotational velocity of a motor 21. On a first reel 22, a tape is wound from one end thereof. On a second reel 23, the tape is wound from the other end thereof A present-position-detecting-unit 24 detects the present position of the tape based on a first and a second rotation detecting signals respectively generated by the first reel 22 and the second reel 23. A velocity detecting unit 25 detects the running velocity of the tape based on the rotation detecting signals generated by the first reel 22 and the second reel 23, and, a motor-rotation-detecting-signal generated by the motor 21. A tape-area-detecting-unit 26 detects the respective areas of the tape wound on the first reel 22 and the second reel 23 based on the rotation detecting signals generated by the first reel 22 and the second reel 23.

A tape-A-first-decelerating-position-storing-unit 27 stores a first deceleration beginning position which is optimal for a tape-A wound on the windings of the tape (i.e., wound on hubs formed with the respective windings of the tape wound on a first reel and a second reel), which (i.e., the hubs) have predetermined diameters in the occasion of the fast forward or backward winding of the tape. A tape-A-second-decelerating-position-storing-unit 28 stores a second deceleration beginning position which is optimal for the tape-A in the occasion of the fast forward or backward winding of the tape. A tape-B-first-decelerating-position-storing-unit 29 stores a first deceleration beginning position which is optimal for a tape-B wound on the windings of the tape (i.e., wound on hubs formed with the respective windings of the tape wound on a first reel and a second reel), which (i.e., the hubs) have predetermined diameters differing from the diameters of the hubs of the tape-A in the occasion of the fast forward or backward winding of the tape. A tape-B-second-decelerating-position-storing-unit 210 stores a second deceleration beginning position which is optimal for the tape-B in the occasion of the fast forward or backward winding of the tape.

A decelerating-position-selecting-unit 211 selects either of the deceleration beginning positions for the tape-A or the deceleration beginning positions for the tape-B based on the tape areas detected by the tape-area-detecting-unit 26. A comparing unit 212 compares the present position detected by the present-position-detecting-unit 24 with the first or the second deceleration beginning positions for the tape-A, or, with the first or the second deceleration beginning positions for the tape-B. A motor control unit 213 instructs the motor 21 to reduce the rotational velocity of the motor 21 when the comparing unit 212 judges that the present position of the tape is located at either of the first or the second deceleration beginning positions, or, behind either of the first or the second deceleration beginning positions in the running direction of the tape.

The operation of the tape transport device of this exemplary embodiment having the above structure is described hereinafter.

To begin with, the first reel 22 is rotated by the motor 21 in such a manner as to rotate at the rotational velocity which is proportional to the rotational velocity of the motor 21, whereby the second reel 23 is rotated in such a manner that the tape wound on the second reel 23 is wound up by the first reel 22. The present-position-detecting-unit 24 detects the present position of the tape based on the first and the second rotation detecting signals respectively generated by the first reel 22 and the second reel 23. The tape-area-detecting-unit 26 detects the respective areas of the tape wound on the first reel 22 and the second reel 23 based on the rotation detecting signals generated by the first reel 22 and the second reel 23.

The decelerating-position-selecting-unit 211 selects deceleration beginning positions for the tape-A or for the tape-B from the deceleration beginning positions respectively stored in the tape-A-first-decelerating-position-storing-unit 27, the tape-A-second-decelerating-position-storing-unit 28, the tape-B-first-decelerating-position-storing-unit 29 and the tape-B-second-decelerating-position-storing-unit 210 based on the tape areas detected by the tape-area-detecting-unit 26.

In this case, the decelerating-position-selecting-unit 211 selects the deceleration beginning positions for the tape-A when the decelerating-position-selecting-unit 211 judges that the tape areas detected by the tape-area-detecting-unit 26 are larger than predetermined values, for instance, in the case that the tape-A is a tape which is wound on larger diameter hubs of the tape, or, selects the deceleration beginning positions for the tape-B when the decelerating-position-selecting-unit 211 judges that the tape areas detected by the tape-area-detecting-unit 26 are smaller than the predetermined values, for instance, in the case that the tape B is a tape which is wound on smaller diameter hubs of the tape.

The comparing unit 212 compares the present position detected by the present-position-detecting-unit 24 with either of the deceleration beginning positions selected by the decelerating-position-selecting-unit 211. When the comparing unit 212 judges that the present position is located at or behind the tape-A first deceleration beginning position or the tape-B first deceleration beginning position in the running direction of the tape, the motor control unit 213 instructs the motor 21 to reduce the rotational velocity of the motor 21, whereby the rotational velocity of the motor 21 (i.e., the tape velocity) is reduced. After that, when the velocity detecting unit 25 detects that the tape velocity is reduced to a predetermined reduced velocity, the motor control unit 213 suspends the decelerating instruction to the motor 21, whereby the tape velocity is kept at the predetermined reduced velocity.

After that, when the comparing unit 212 judges that the present position is located at or behind the tape-A second deceleration beginning position or the tape-B second deceleration beginning position in the running direction of the tape, the motor control unit 213 instructs the motor 21 to reduce the rotational velocity of the motor 21, whereby the rotational velocity of the motor 21 (i.e., the tape velocity) is reduced. After that, when the velocity detecting unit 25 detects that the tape velocity is reduced to a predetermined safe velocity which does not damage the tape or the tape transport at the tape end, the motor control unit 213 stops the decelerating instruction to the motor 21, whereby the tape velocity is kept at the predetermined safe velocity up to the end of the tape.

As described in the above, in this exemplary embodiment, the tape-A-first-decelerating-position-storing-unit 27 and the tape-A-second decelerating-position-storing-unit 28 respectively stores optimal deceleration beginning positions for the tape-A, and, the tape-B-first decelerating-position-storing-unit 29 and the tape-B-second-decelerating-position-storing-unit 210 respectively stores optimal deceleration beginning positions for the tape-B. Also by disposing the tape-area-detecting-unit 26, the decelerating-position-selecting-unit 211, and the four decelerating-position-storing-units (27, 28, 29 and 210), the tape areas wound on the respective reels (22, 23) are detected, and the deceleration beginning positions are properly selected based on the detected tape areas. As a result, the time required for reducing the tape velocity from the first deceleration beginning position to the end of the tape is optimally decreased according to the diameters of the respective hubs of the tape wound on the respective reels (22, 23).

In the tape transport device of FIG. 4, the first and the second deceleration beginning positions are respectively provided for the tape-A and for the tape-B (i.e., four deceleration beginning positions in total). However, by providing more than two deceleration beginning positions for the two different tapes having respectively different-diameter-hubs, or by providing more than two deceleration beginning positions for more than two different tapes respectively having different-diameter-hubs, the similar effect can be obtained.

As described in the above, in the tape transport device of the present invention, when the thickness of the tape is decreased, the average tape velocity from the first deceleration beginning position to the end of the tape can be increased by providing a plurality of intermediate stages where the tape runs at respective predetermined reduced velocities, thus the time required for the tape to run from the first deceleration beginning position of the tape to the end of the tape is decreased even when the thickness of the tape is decreased.

What is claimed is:

1. A tape transport device comprising:
   (a) a motor;
   (b) a first reel on which a tape is wound from one end thereof and rotates at a rotational velocity which is proportional to a rotational velocity of said motor;
   (c) a second reel on which said tape is wound from an other end thereof;
   (d) a present-position-detecting-unit for detecting a present position of said tape based on first and second rotation detecting signals respectively generated by said first and said second reels and having respective frequencies which are proportional to respective rotational velocities of said first and said second reels;
   (e) a velocity detecting unit for detecting running velocity of said tape based on the first and the second rotation detecting signals, and a motor-rotation-detecting-signal generated by said motor and having a frequency which is proportional to the rotational velocity of said motor;
   (f) a plurality of decelerating-position-storing-units, each decelerating-position-storing unit storing a different deceleration beginning position used in one of fast forward winding and fast backward winding of said tape;
   (g) a comparing unit for successively comparing the present position of said tape with the deceleration beginning positions of said decelerating-position-storing-units; and
   (h) a motor control unit for controlling the rotational velocity of said motor based on the running velocity of said tape as detected by said velocity detecting unit, and for successively instructing said motor to reduce the rotational velocity of said motor when said comparing unit judges that the present position of said tape is located at one of the deceleration beginning positions or at a position past one of the deceleration beginning positions of said tape in a running direction of said tape.

2. A tape transport device comprising:
   (a) a motor;
   (b) a first reel on which a tape is wound from one end thereof and rotates at a rotational velocity which is proportional to a rotational velocity of said motor;
   (c) a second reel on which said tape is wound from an other end thereof;
   (d) a present-position-detecting-unit for detecting a present position of said tape based on first and second rotation detecting signals respectively generated by said first and said second reels and having respective frequencies which are proportional to respective rotational velocities of said first and said second reels;
   (e) a tape-area-detecting-unit for detecting respective areas of said tape wound on said first and said second reels based on the first and the second rotation detecting signals;
   (f) a velocity detecting unit for detecting running velocity of said tape based on the first and the second rotation detecting signals, and a motor-rotation-detecting-signal generated by said motor and having a frequency which is proportional to the rotational velocity of said motor;
   (g) a plurality of decelerating-position-storing-units, each decelerating position-storing-unit storing a different deceleration beginning position used in one of fast forward winding and fast backward winding of said tape;
   (h) a decelerating-position-selecting-unit for selecting a proper deceleration beginning position from the deceleration beginning positions stored in said plurality of decelerating-position-storing-units based on the tape areas detected by said tape-area-detecting-unit;
   (i) a comparing unit for successively comparing the present position of said tape with the deceleration beginning position selected by said decelerating-position-selecting-unit; and
   (j) a motor control unit for controlling the rotational velocity of said motor based on the running velocity of said tape, as detected by said velocity detecting unit, and for successively instructing said motor to reduce the rotational velocity of said motor when the comparing unit judges that the present position of said tape is located at one of the deceleration beginning positions selected by said decelerating-position-selecting-unit or at a position past one of the deceleration beginning positions selected by said decelerating-position-selecting-unit in a running direction of said tape.

* * * * *